Dec. 22, 1964  J. T. GONDEK  3,162,170
DEVICE FOR LOADING A TORPEDO TUBE
Filed March 22, 1956  14 Sheets-Sheet 1
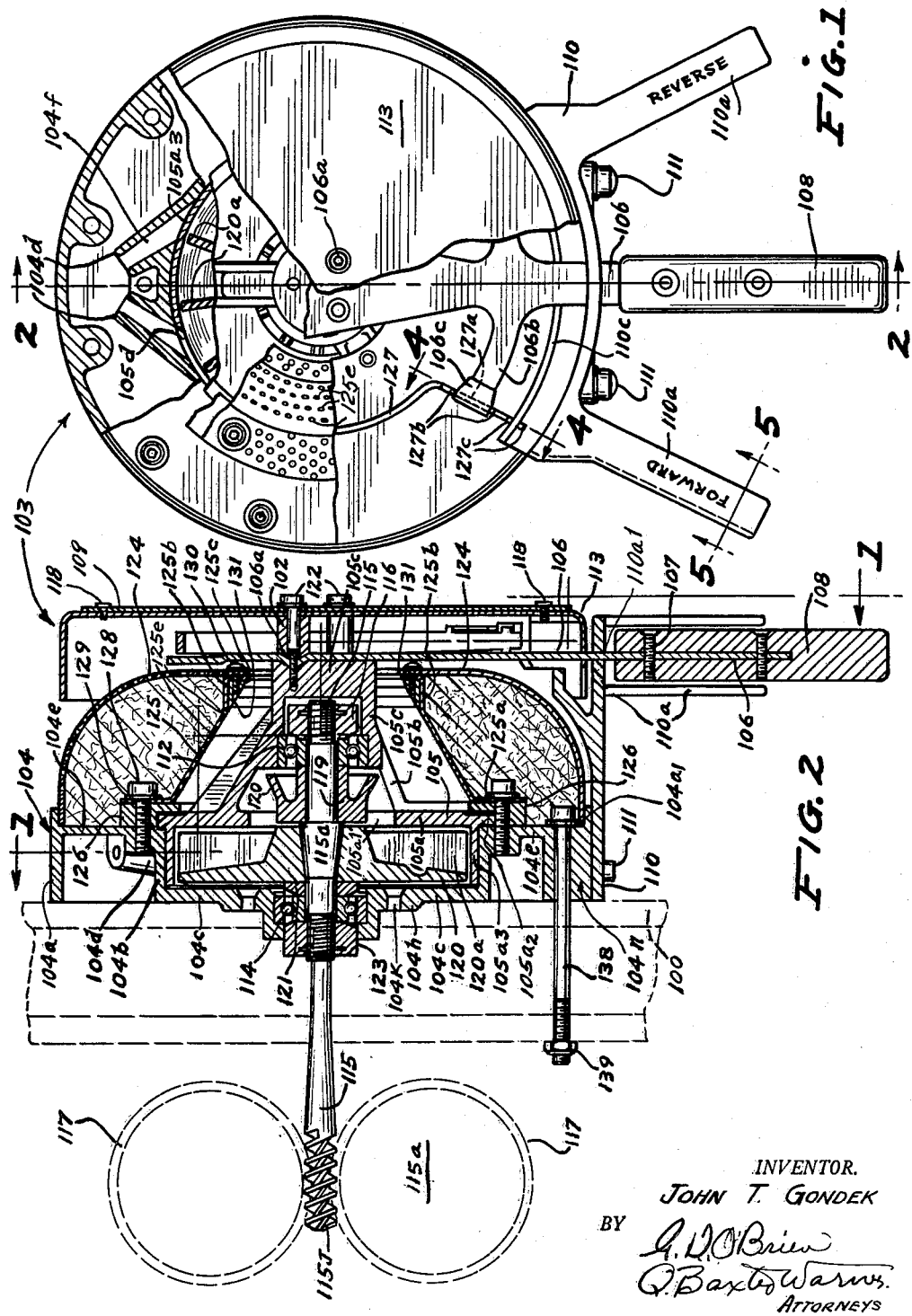
INVENTOR.
JOHN T. GONDEK
BY
G. D. O'Brien
Q. Baxter Warner
ATTORNEYS Dec. 22, 1964 J. T. GONDEK 3,162,170
DEVICE FOR LOADING A TORPEDO TUBE
Filed March 22, 1956 14 Sheets-Sheet 2

INVENTOR.
JOHN T. GONDEK
BY G. O'Brien
Q. Baxter Warner
ATTORNEYS

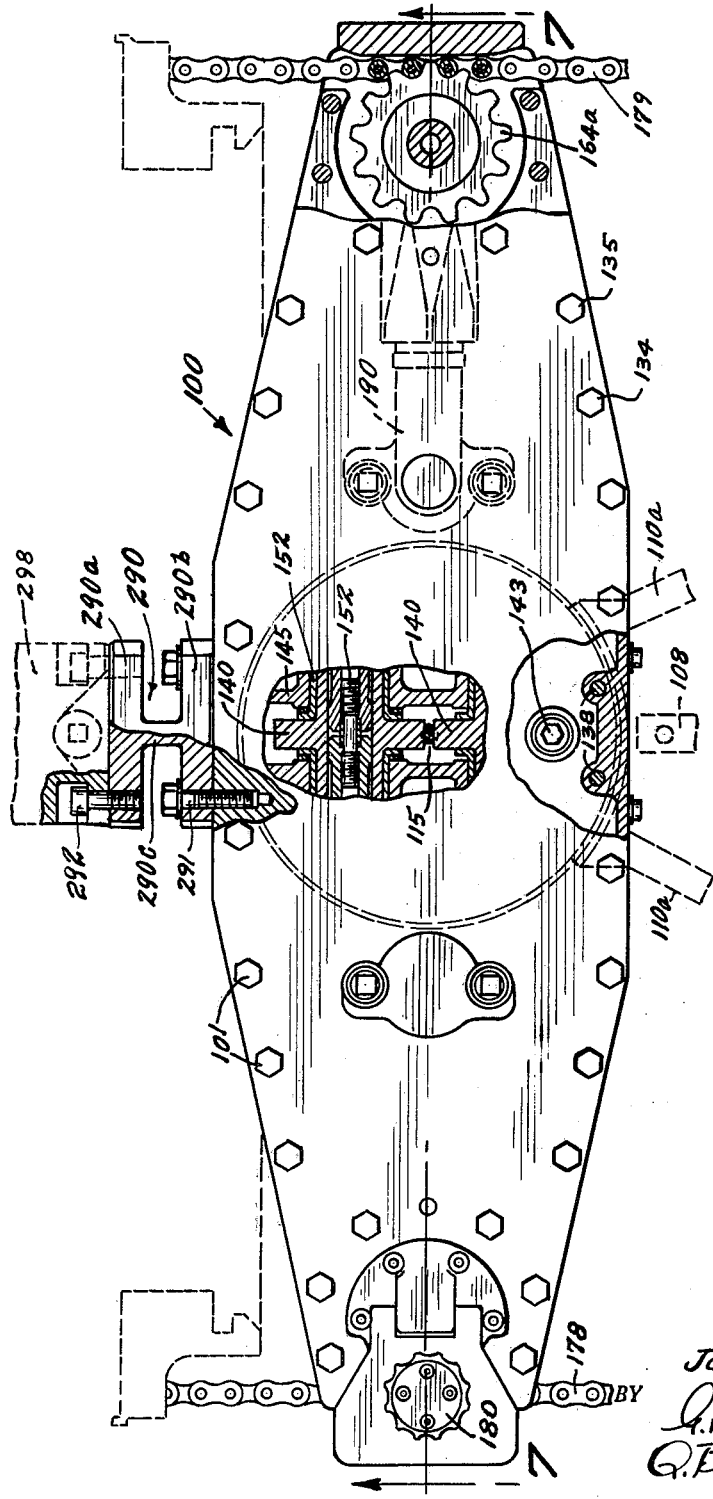

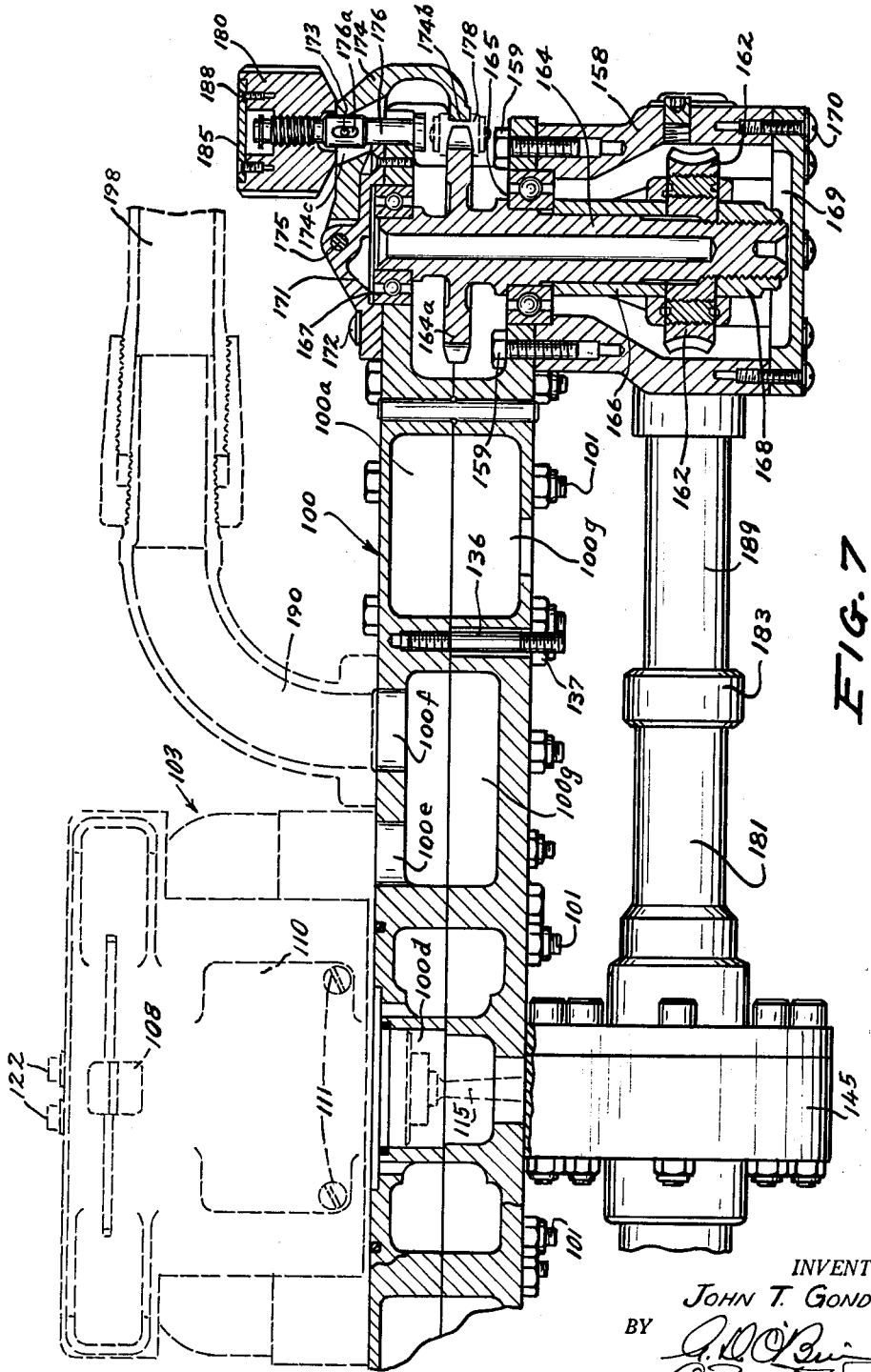

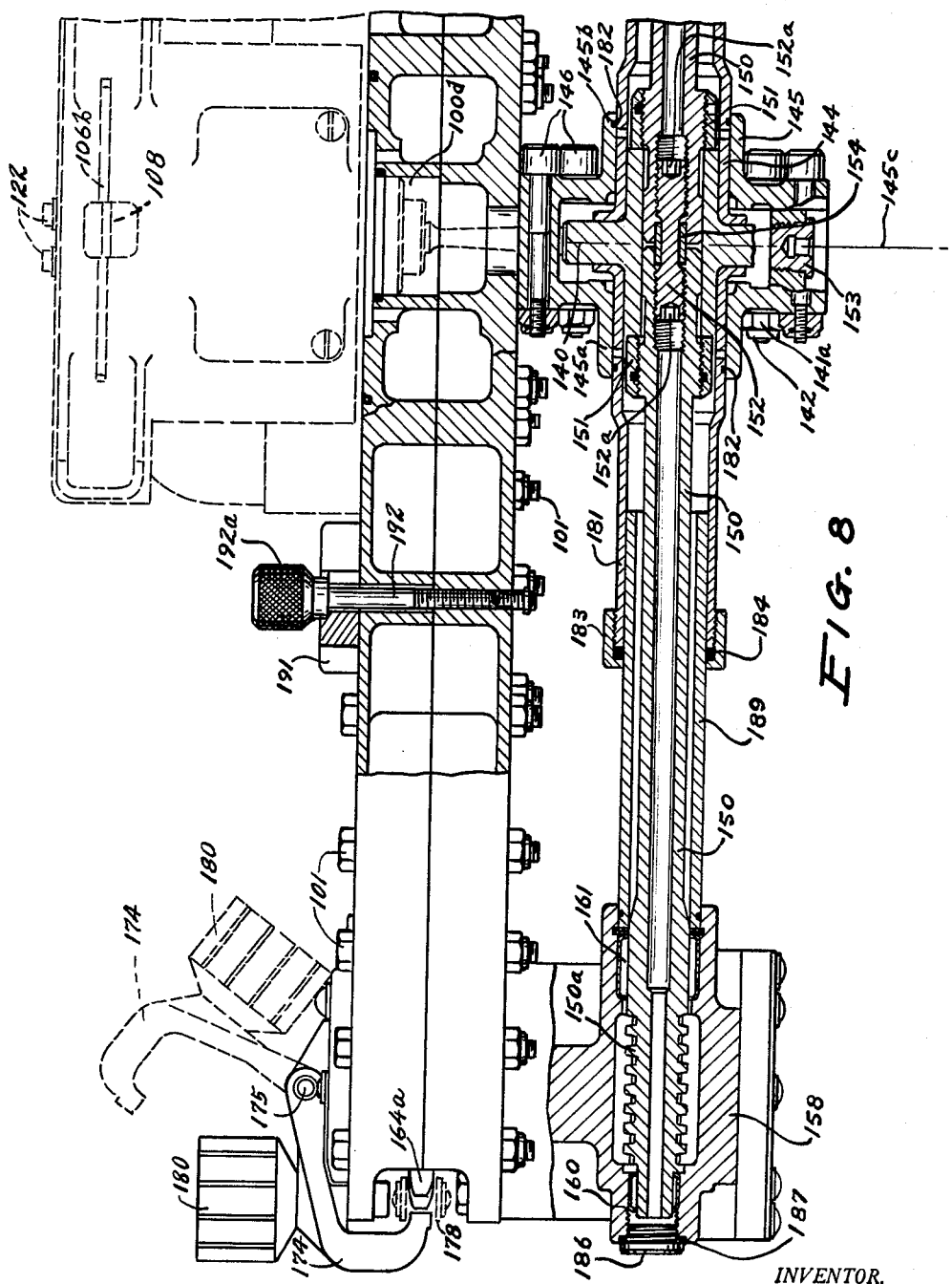

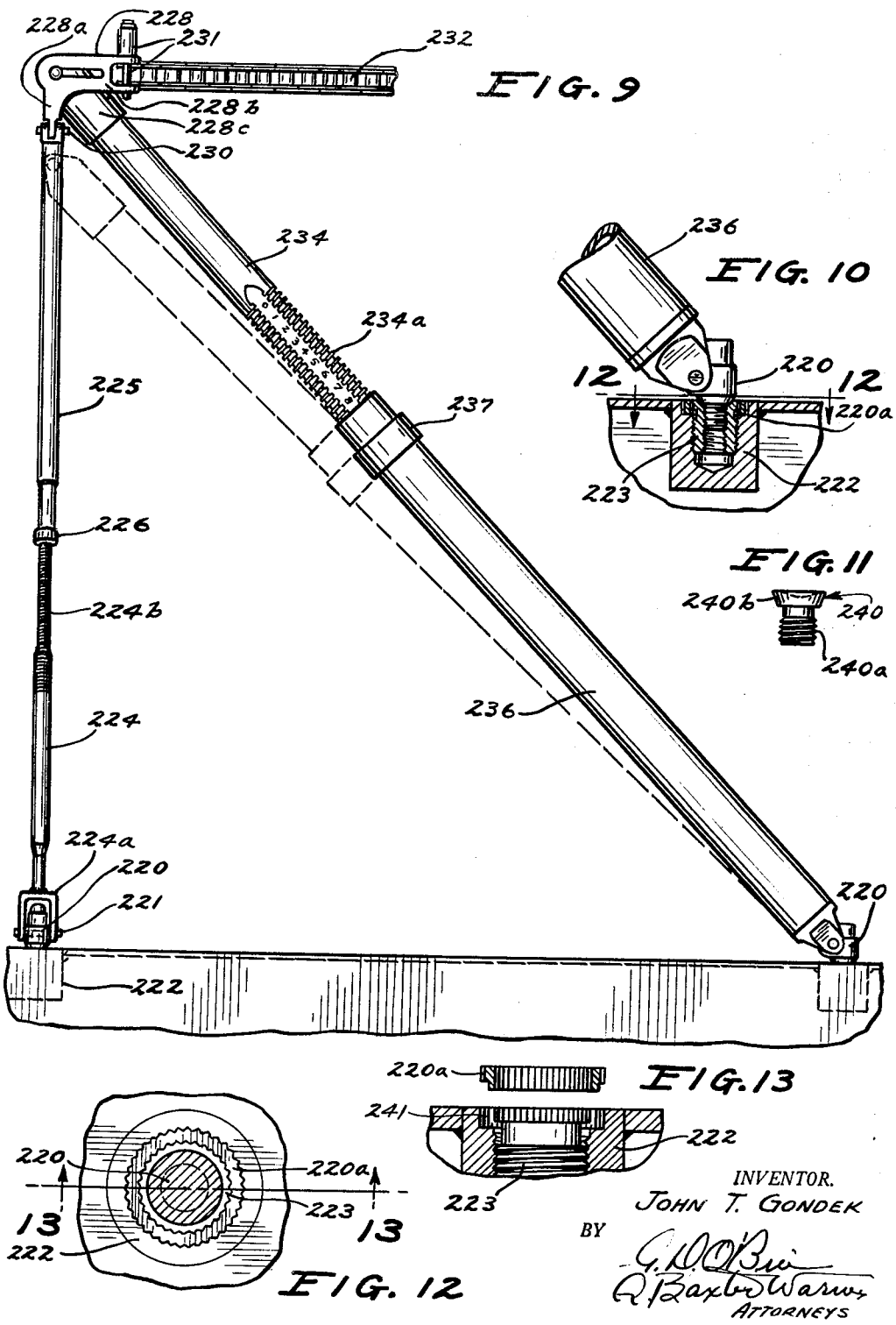

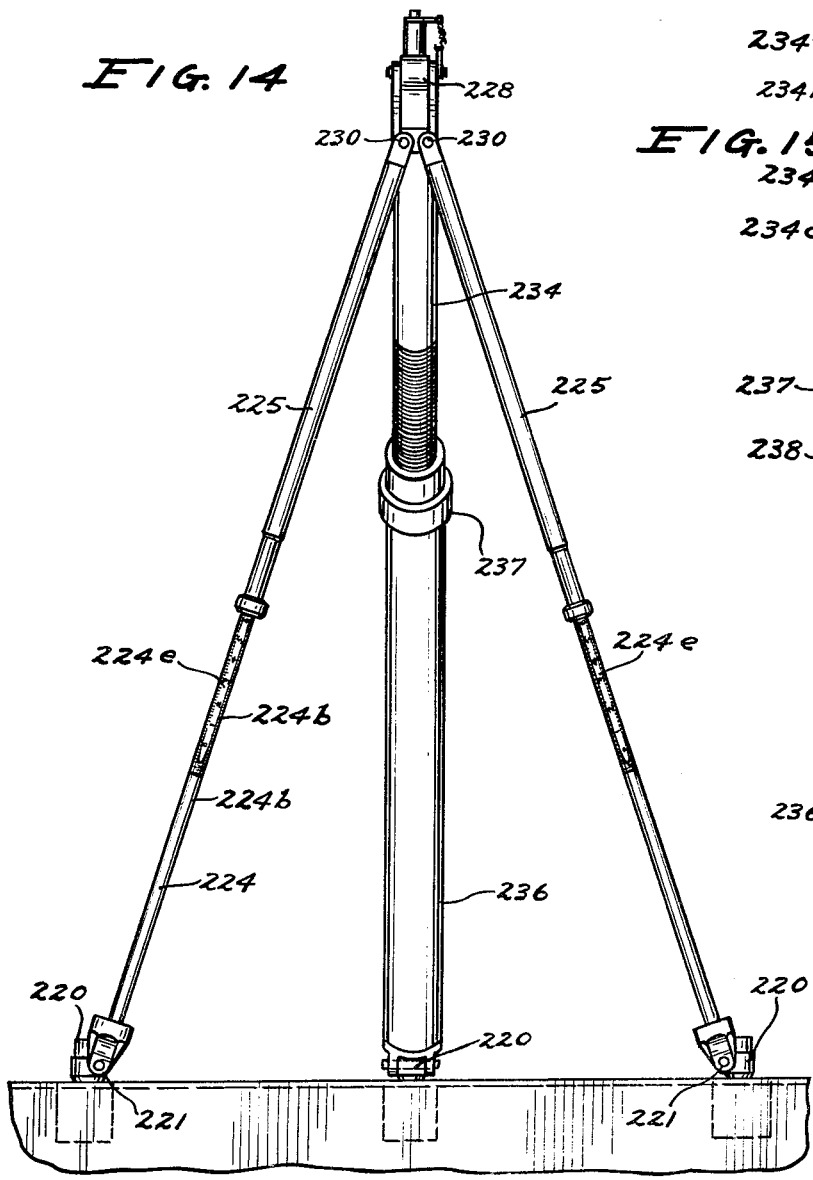
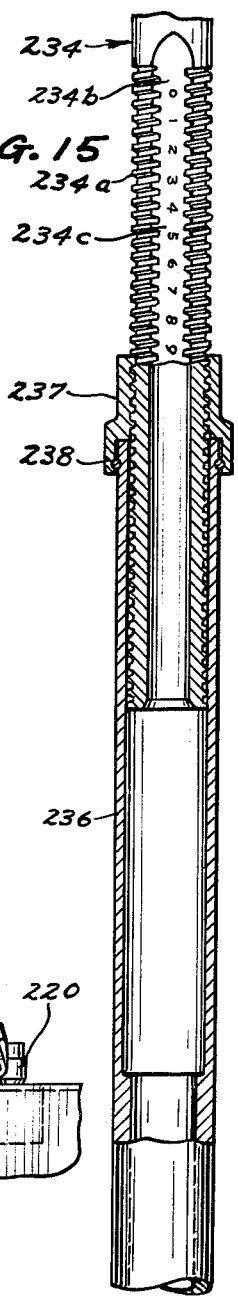
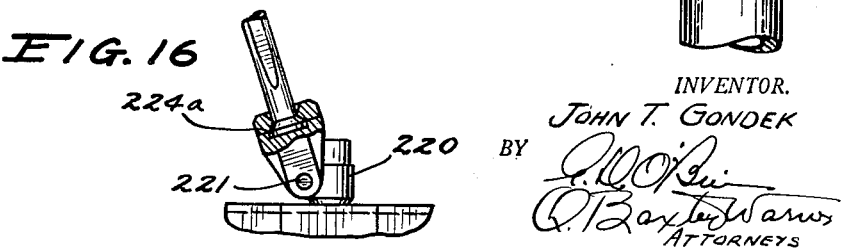

Dec. 22, 1964   J. T. GONDEK   3,162,170
DEVICE FOR LOADING A TORPEDO TUBE
Filed March 22, 1956   14 Sheets-Sheet 8
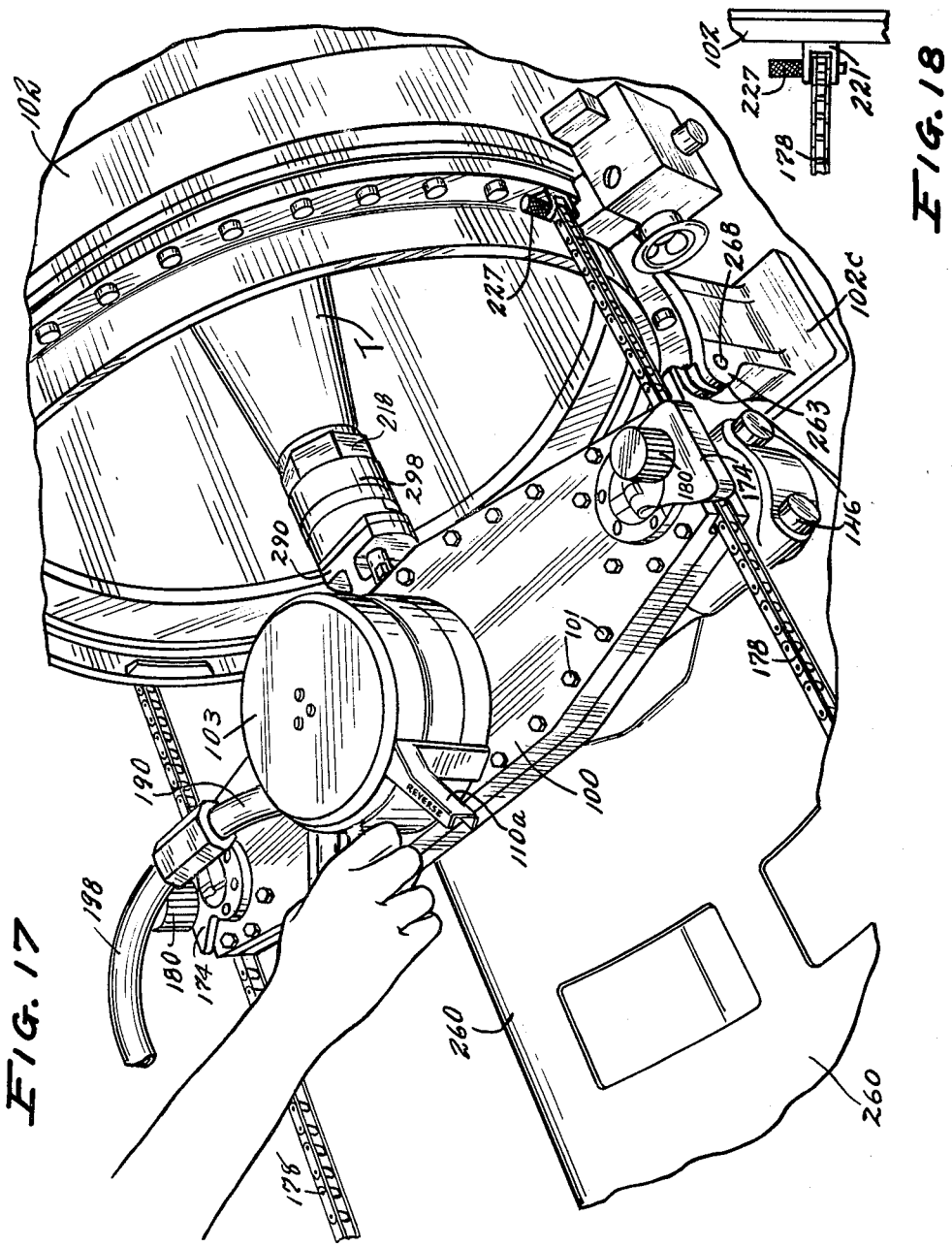
INVENTOR.
JOHN T. GONDEK
BY
ATTORNEYS

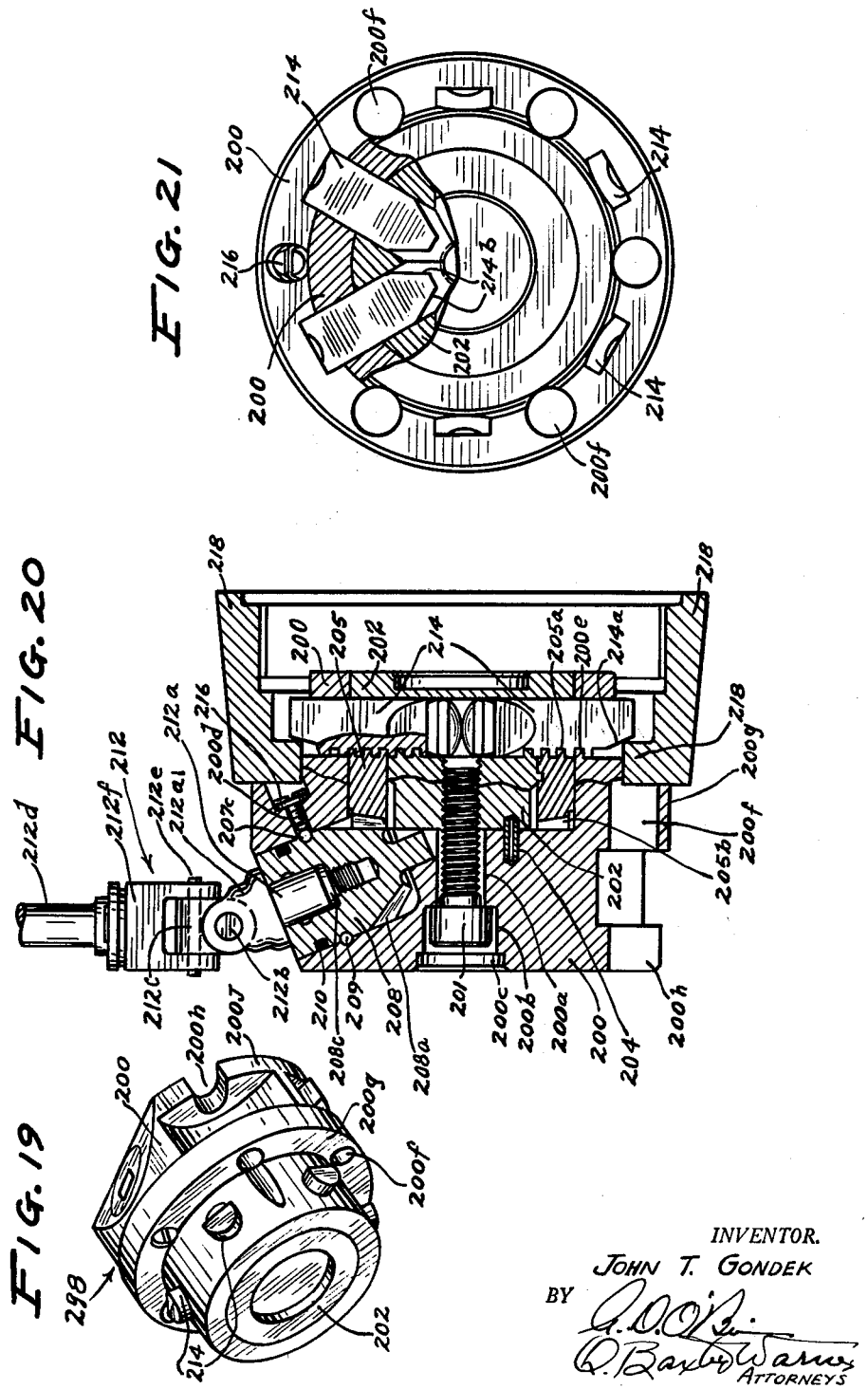

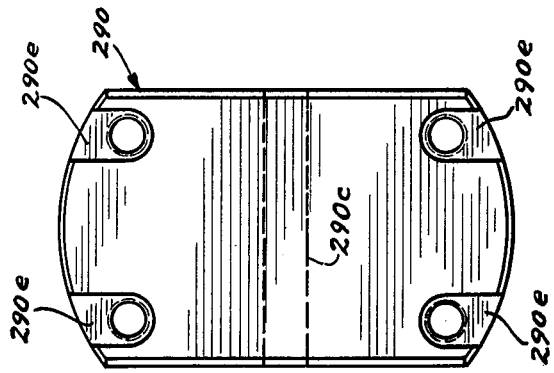
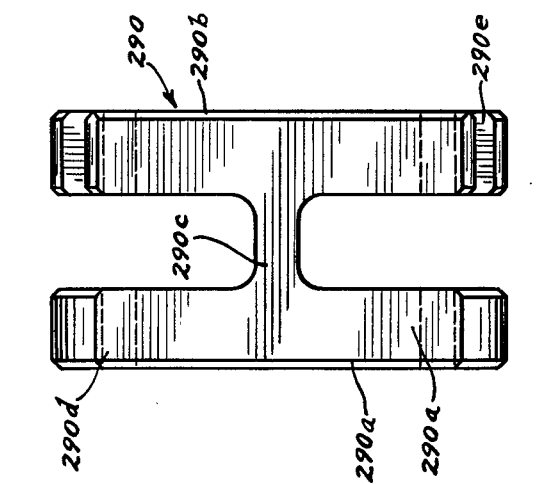
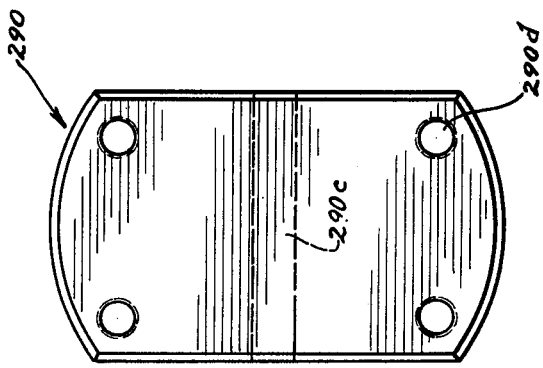

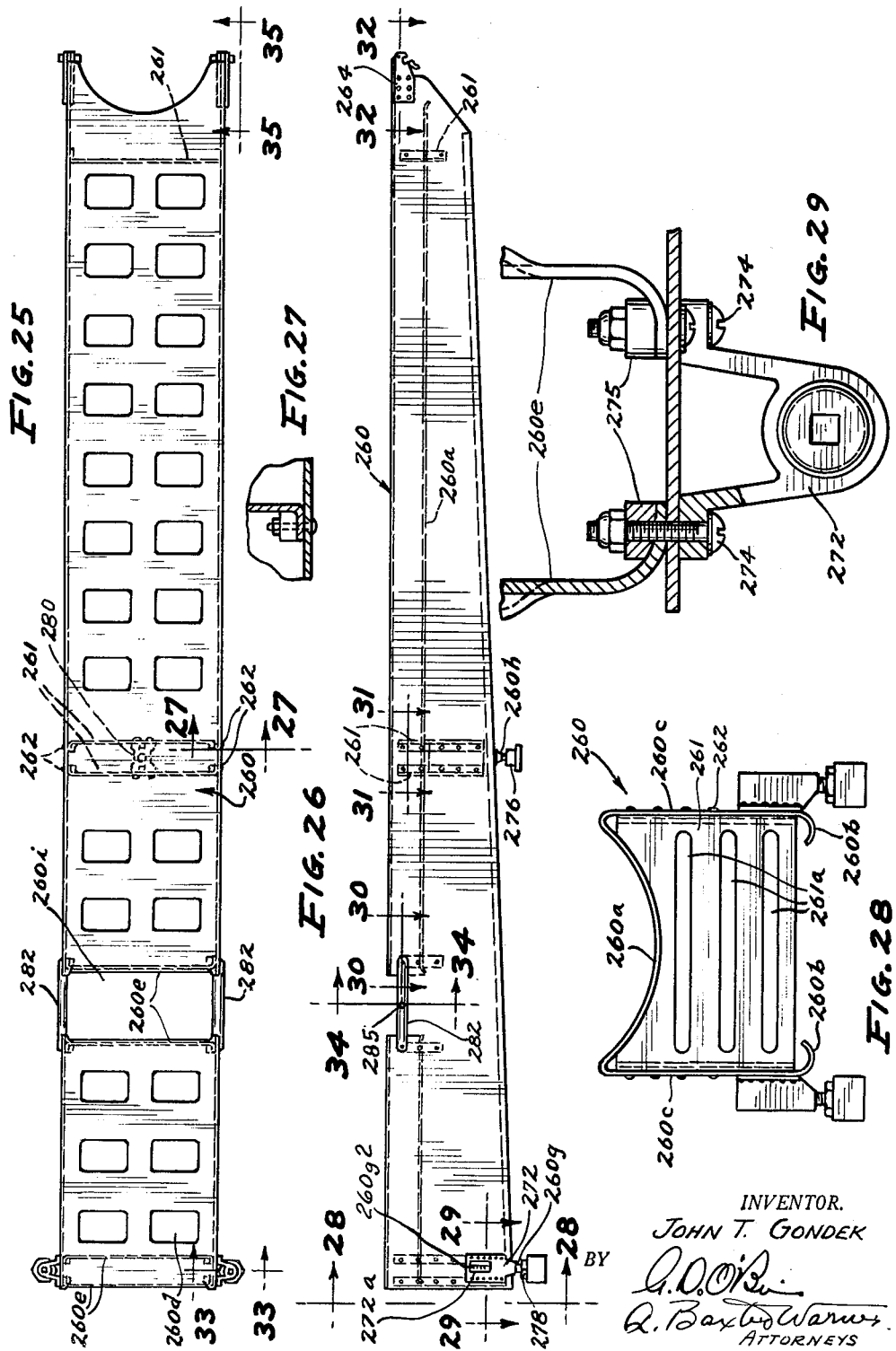

Dec. 22, 1964  J. T. GONDEK  3,162,170
DEVICE FOR LOADING A TORPEDO TUBE
Filed March 22, 1956  14 Sheets-Sheet 12
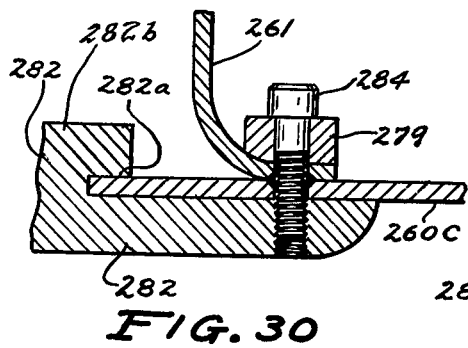
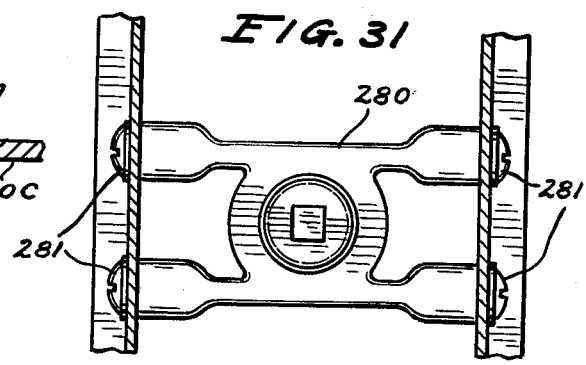
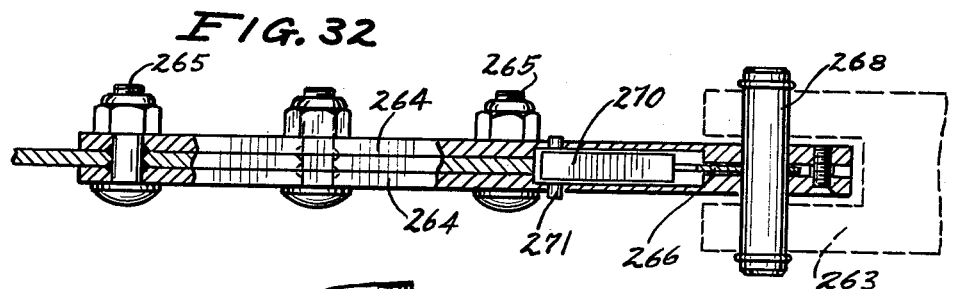
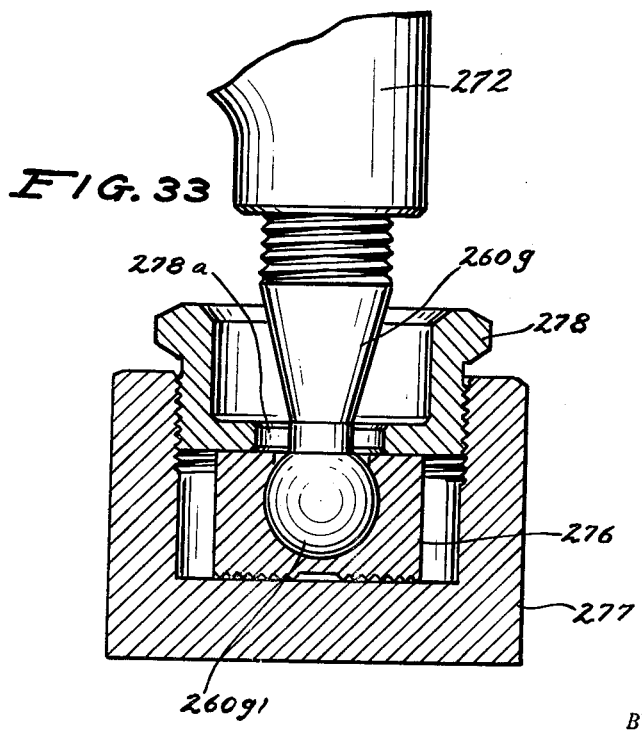
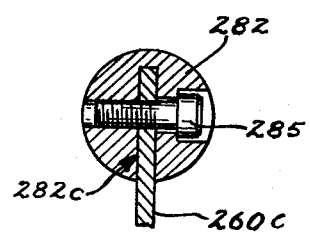
INVENTOR.
JOHN T. GONDEK
BY
ATTORNEYS

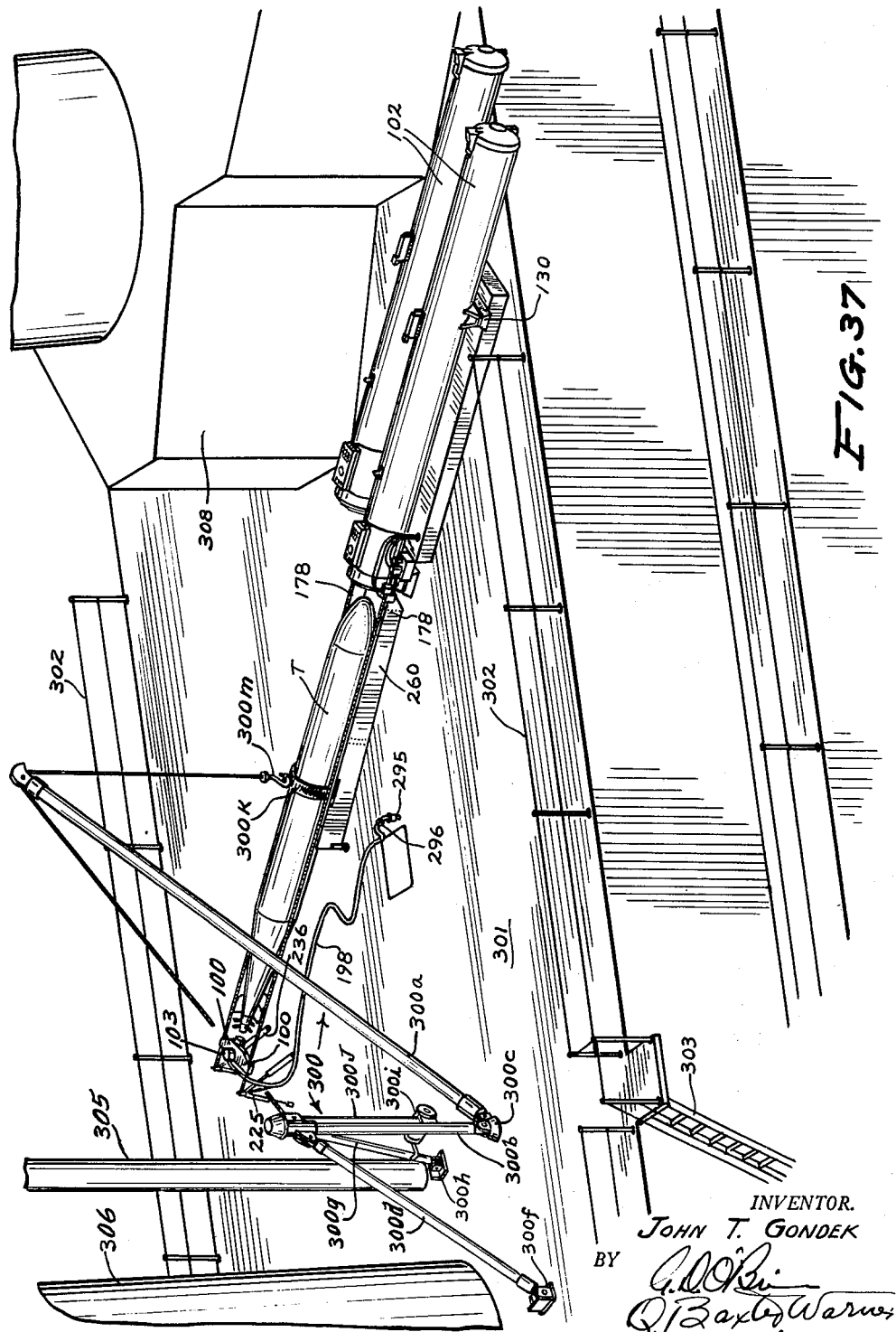

United States Patent Office

3,162,170
Patented Dec. 22, 1964

3,162,170
DEVICE FOR LOADING A TORPEDO TUBE
John T. Gondek, Minneapolis, Minn., assignor, by mesne assignments, to the United States of America as represented by the Secretary of the Navy
Filed Mar. 22, 1956, Ser. No. 573,305
23 Claims. (Cl. 114—238)

This invention relates to a device for loading a torpedo into a torpedo tube. While the loading device of this invention may be used on many types of torpedo tubes, one particular tube with which it has been used is the torpedo tube disclosed and claimed in an application filed by the present applicant and of even date with this application.

It is an object of this invention to provide a simple and efficient loading device for moving a torpedo into a torpedo tube.

It is an object of this invention to provide quite a simple and very efficient loading device for pushing a torpedo into a torpedo tube, said device comprising a member movable with the torpedo and carrying a motor, which motor furnishes the power for moving the torpedo.

It is another object of the invention to provide a loading device for moving a torpedo into a torpedo tube, the same comprising a member having means for connecting a portion thereof to the torpedo, said member carrying a motor for driving a propulsion means including rotary members adapted to engage a pair of stationary members respectively extending along each side of said torpedo, said rotary means moving along said stationary members with said first mentioned member to push said torpedo into said tube.

It is also an object of this invention to provide a torpedo loading device comprising a frame adapted to be connected to said torpedo, a motor carried by said frame, a sprocket carried at each end of said frame, means for rotating said sprockets from said motor and a pair of members extending along each side of said torpedo and secured in stationary relation to said torpedo tube, said members being respectively engaged by said sprockets and said frame being moved along said members by said sprockets.

It is further an object of the invention to provide such a device as set forth in the preceding paragraph, said members comprising link chains respectively engaged by said sprockets.

It is also an object of this invention to provide a loading device for moving a torpedo into a torpedo tube comprising a pair of members respectively supported at one end in stationary relation to said torpedo tube and extending along the sides of said torpedo, and supporting means for the other ends of said members detachably secured to the deck of a ship and being collapsible into a comparatively small space.

It is still further an object of the invention to provide a loading device for moving a torpedo into a torpedo tube including a frame member adapted to be connected to said torpedo, an air motor carried by said frame and a pair of members driven by said motor adapted to engage a pair of stationary members respectively extending along each side of said torpedo and move along said members for moving said frame and moving said torpedo into said tube.

It is still another object of this invention to provide a loading device for moving a torpedo into a torpedo tube, including a loading tray for supporting said torpedo in substantial axial alinement with said tube, members extending from adjacent said torpedo tube to a point beyond the remote end of said torpedo, and motor driven means adapted to engage said torpedo and to engage said members and be moved along said members to push said torpedo from said tray and into said tube.

It is more specifically an object of this invention to provide a loading device for moving a torpedo into a torpedo tube, comprising a pair of chains extending respectively at the sides of said torpedo and fixed at their front ends, stationary means supporting the other ends of said chains, a frame having sprockets at each side thereof adapted to engage said chains respectively, a motor carried by said frame, and means for rotating said sprockets by said motor so that they move along said chains and push said torpedo into said tube.

It is further an object of this invention to provide such a structure as set forth in the preceding paragraph, together with novel means for supporting the respective ends of said chains.

It is more specifically an object of this invention to provide a device as set forth in the preceding paragraph save one, together with collapsible tripods for supporting the ends of said chains remote from said torpedo tube, said tripods being preferably secured to a support such as the deck of a ship.

It is still more specifically an object of the invention to provide such a device as set forth in the preceding paragraph, said motor having a vertical shaft having a worm gear at one end, a pair of worm wheel gears disposed respectively at each side of said worm gear and meshing therewith, shafts secured to and extending oppositely from the sides of each of said worm wheel gears respectively, a worm gear at the ends of each of said shafts remote from said worm wheel gears thus providing adjacent pairs of worm gears on two pairs of parallel shafts, a worm wheel gear between the worm gears of each of said last mentioned pairs of worm gears and meshing therewith, shafts driven by said last mentioned worm wheel gears, and said sprockets being respectively secured to said last mentioned shafts.

It is further an object of this invention to provide a torpedo loading device comprising a member carrying a motor, propulsion means driven by said motor, stationary members engaged by said propulsion means and along which said means move to move said torpedo, and means for supporting said stationary members at the ends thereof opposite said tube, said parts being constructed and arranged to be assembled in operative condition on the deck of a ship and to be dismantled and stored in a comparatively small space when not in use.

These and other objects and advantages of the invention will be fully set forth in the following description made in connection with the accompanying drawings in which like reference characters refer to similar parts throughout the several views and in which:

FIG. 1 is a top plan view of an air motor used, certain parts being broken away and others shown in horizontal section, taken substantially on line 2—2 of FIG. 2, as indicated by the arrows;

FIG. 2 is a central vertical section taken on line 2—2 of FIG. 1, as indicated by the arrows;

FIG. 6 is a top plan view of the frame and driving mechanism for moving the torpedo, some parts being broken away and others shown in horizontal section;

FIG. 7 is a view in front elevation of the parts shown in FIG. 6, some parts being shown in vertical section taken on line 7—7 of FIG. 1, as indicated by the arrows;

FIG. 8 is a view partly in front elevation of the parts shown in FIG. 6 with some parts shown in vertical section taken on line 7—7 of FIG. 6, as indicated by the arrows;

FIG. 9 is a view in side elevation of the supporting means for a chain used in moving the torpedo;

FIG. 10 is a view partly in vertical section and partly in side elevation of the securing means for member 236 in FIG. 9, the same being shown on an enlarged scale;

FIG. 11 is a view in side elevation of a part used in connection with the parts shown in FIG. 10;

FIG. 12 is a top plan view partly in horizontal section taken on line 12—12 of FIG. 10, as indicated by the arrows;

FIG. 13 is a vertical section taken substantially on line 13—13 of FIG. 12, as indicated by the arrows;

FIG. 14 is a view in front elevation of the parts shown in FIG. 9;

FIG. 15 is a partial view partly in front elevation and partly in vertical section of one of the parts shown in FIG. 14;

FIG. 16 is a view partly in side elevation and partly in vertical section of one of the supporting means for member 224 of FIG. 14;

FIG. 17 is a perspective view showing the rear portion of the torpedo tube, the rear portion of the torpedo, and the air motor and frame which carries the same, and the driving mechanism for moving the torpedo;

FIG. 18 is a partial view in side elevation showing the holding means for the end of chain 178 shown in FIG. 17;

FIG. 19 is a perspective view of a connecting means and chuck adapted to be connected to the torpedo;

FIG. 20 is a central vertical section of the member shown in FIG. 19, parts thereof being in different planes;

FIG. 21 is a view in front elevation of the member shown in FIG. 19 as seen from the right-hand side of FIG. 20, certain parts being broken away and others shown in vertical section;

FIG. 22 is a view in side elevation of a connecting link used;

FIG. 23 is a view in front elevation of the link shown in FIG. 22;

FIG. 24 is a view in side elevation of said link as seen from the right of FIG. 23;

FIG. 25 is a top plan view of a supporting tray used with the torpedo;

FIG. 26 is a view in side elevation of said supporting tray;

FIG. 27 is a vertical section taken substantially on line 27—27 of FIG. 25, as indicated by the arrows;

FIG. 28 is a view in end elevation of said supporting tray as seen from line 28—28 of FIG. 26 looking in the direction of the arrows;

FIG. 29 is a vertical section taken on line 29—29 FIG. 26, as indicated by the arrows;

FIG. 30 is a vertical section taken on line 30—30 of FIG. 26, as indicated by the arrows;

FIG. 31 is a horizontal section taken on line 31—31 of FIG. 26, as indicated by the arrows;

FIG. 32 is a top plan view of one portion of said supporting tray, most of which is in vertical section taken on line 32—32 of FIG. 26, as indicated by the arrows;

FIG. 33 is a view in side elevation of a supporting leg for said supporting tray, the supporting means therefore being shown in vertical section taken on line 33—33 of FIG. 25, as indicated by the arrows;

FIG. 34 is a vertical section taken on line 34—34 of FIG. 26, as indicated by the arrows;

FIG. 37 is a perspective view showing the torpedo loading device in operative position on the deck of a ship.

Air Motor

Figure 3:
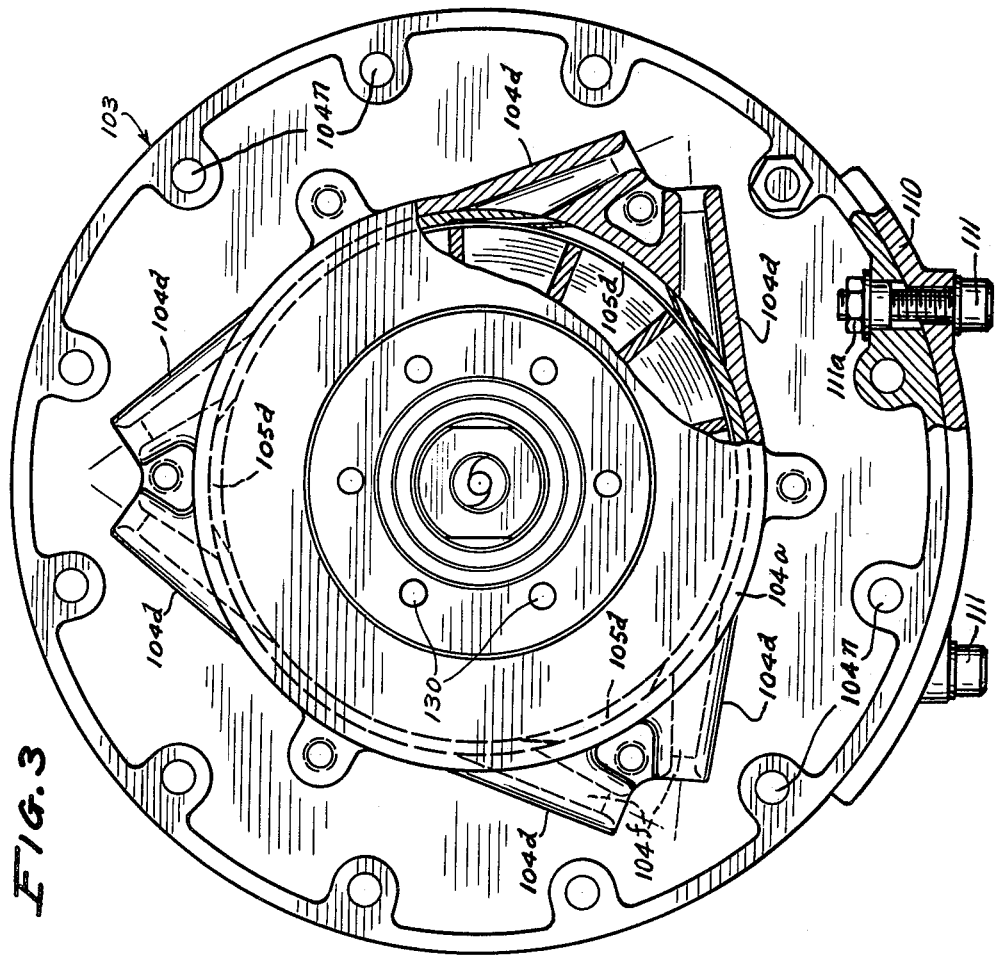
FIG. 3 is a top plan view of the air motor shown in FIG. 1, certain parts being removed and others shown in horizontal section.

Referring to the drawings, the power for moving the torpedo into the torpedo tube is furnished by an air turbine motor. This motor 103 is mounted at the center of a frame 100 which supports the drive mechanism for the loader. Said motor and drive mechanism are connected to said frame 100 which comprises upper and lower portions 100a and 100b connected by a series of headed and nutted bolts 101. (See FIGS. 7 and 8.)

Said motor comprises a housing 104 having a cylindrical portion 104a at its lower end. Said cylindrical portion is spaced from an inner cylindrical wall 104b depending from the inner side of an upper annular plate-like portion 104e. The annular space between portions 104a and 104b provides a chamber for the inlet of air to said motor. Portion 104b has a plurality of pairs of nozzles 104d carried thereby, as shown in FIGS. 1 and 2. Said pairs of nozzles are shown as three in number and said nozzles have inwardly flaring passages 104f therein, which nozzles converge outwardly. The plate-like portion 104c has projecting downwardly therefrom a cylindrical boss 104h having a reduced lower cylindrical end portion. A rotatable member 105 has an annular plate-like portion 105a having a central opening 105a1 and having a short projecting peripheral flange 105a2. Member 105 also has an annular vertical plate-like portion or ring 105a3 within and rotatable in the annular wall 104b. Member 105 comprises upwardly and converging arms 105b connected at their upper ends to a hub 105c. Ring 105a has three equally spaced openings 105d therein having inwardly diverging sides, as shown in FIG. 1. Openings 105d are horizontally alined with the passages 104f in the nozzles 104d. Hub 105c has a flat top surface to which is secured a bar 106 extending laterally and having secured thereto by the screws 107 a handle 108. An arcuate bracket 110 is secured to one side of housing 104 by screws 111 equipped with nuts 111a. (See FIG. 3.) Bracket 110 has a flange extending upwardly and having an arcuate slot 110a1 therein through which bar 106 passes. Bar 106 has a plurality of holes 106a with countersunk portions thereabout and thimbles 102 having tapered lower ends disposed in said countersunk portions overlie bar 106. Hub 105c has countersinks receiving said countersunk portions. A cover plate 113 rests on thimbles 102 and headed bolts 122 extend through plate 113, thimbles 102 and bar 106 and are threaded into hub 105c, thus securing said parts to said hub. Cover plate 113 has a vertical cylindrical side wall. Bar 106 extends through a slot in said side wall. Bolts 122 also pass through a flat plate 109 overlying cover 113. Screws 118 secure plate 109 to cover 113. Bracket 110 has spaced arms 110a extending radially outward therefrom which are U-shaped in transverse cross section with their open sides facing each other. Arms 110a are horizontally alined with handle 108. Handle 108 is partially receivable in said open sides and can be gripped with arms 110a. Arms 110a form stops for handle 108 and limit the movement of member 105 and thus of openings 105d.

Figure 4:
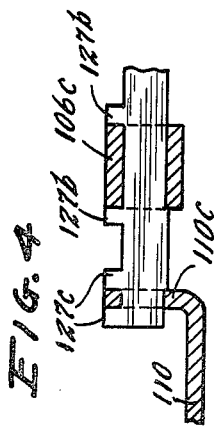
FIG. 4 is a partial vertical section taken on line 4—4 of FIG. 1, as indicated by the arrows.
Figure 5:
FIG. 5 is a vertical section taken on line 5—5 of FIG. 1, as indicated by the arrows.

Bar 106 has curved side portions 106b with reversely bent free ends 106c. A resilient ring 127 has rectilinear end portions 127a arranged to be disposed in portions 106c and having projections 127b at each side of portions 106c. The outer ends of portions 127a extend into openings in a flange 110c on member 110 and have upwardly extending projections 127c, FIG. 4, at each side of said flange 110c. Hub 105c is recessed to receive a ball bearing 112. A ball bearing 114 is disposed in portion 104h of member 104 and a shaft 115 is journaled in ball bearings 112 and 114. A nut 116 is threaded on the upper end of shaft 115. An air deflecting member 119 has a hub through which shaft 115 passes, said member having an outer surface flaring upwardly and outwardly. Member 119 seats at its bottom on a shoulder formed by an enlarged portion 115a of shaft 115. Portion 115a tapers downwardly and fits in the hub of a rotor 120 secured to shaft 115.

While various types of rotors might be used, in the embodiment of the invention illustrated, rotor 120 is shown as having a bottom plate and a plurality of radial blades 120a extending therefrom. Blades 120a are disposed in vertical planes respectively and the outer ends thereof move close to ring 105a3. There are several openings 104k in the bottom of housing 104 leading from the rotor chamber. A washer 121 surrounds shaft 115 below rotor 120 and rests on the top of ball bearing 114. Washer 121 holds rotor 120 on the tapered portion 115a of shaft 115 and rotates with said shaft. A nut 123 is threaded on shaft 115 below ball bearing 114. Shaft 115 extends downwardly below nut 123 for some distance and has formed on its lower end a worm gear 115j. Worm gear 115j meshes with a pair of worm wheel gears 117 at opposite sides thereof in the drive mechanism to be later described.

A cover 124 of general dome shape extends upward from housing 104a, the same fitting in a short annular flange 104a1 on housing 104 and having perforations therein. An annular plate 125 has a bottom horizontally extending flange 125a resting on top of an annular member 126 which in turn rests on housing 104. Plate 125 is secured to housing 104 by a plurality of headed screws 128 threaded into housing 104, passing through flange 125a and member 126 and having washers 129 underlying the heads thereof. Member 126 has an inner flange which extends over a peripheral flange 105a2 on member 105. Plate 125 converges upwardly and has an upper vertical portion 125b terminating in a horizontal inwardly extending short horizontal flange 125c underlying member 124. A number of circumferentially spaced bolts 130 extend through cover 124 and flange 125c and into an annular member 131 fitting in said vertical portion 125b and under flange 125c. Plate 125 has quite a large number of holes 125e in its upwardly extending portion. Cover 124 has an opening at its top about hub 105c, which hub passes through said opening.

Housing 104 has quite a number of holes 104n, FIG. 3, therethrough for receiving bolts 138 which secure the motor to the frame of the drive mechanism. Bolts 138 are equipped with nuts 139 engaging frame 100.

In operation, air is charged into chambers in frame 100 through a conduit 198 and fitting 190, as shown in FIG. 7, and this air passes through an opening 100e in frame 100, into the lower part of housing 104 between the walls 104a and 104b. The air then passes into the nozzles 104d and is directed through the openings 105d into member 105 and against the blades 120a. Member 105 is connected to the bar 106 which is moved by the handle 108. This handle is movable to a central or Neutral position and to Forward and Reverse positions at opposite sides of said neutral position. When member 105 is in neutral position, the nozzles are disposed between the openings 105d and the entry of air in the member 105 is prevented. When the control handle is moved to the Forward position, the openings 105d aline with three of the nozzles which all point in the same direction so that air is delivered to blades 120a causing member 120 to move at a high rate of speed. When the handle 108 is turned to Reverse position, openings 105d will be in alinement with the other three nozzles pointing in the opposite direction so that a reverse rotation of member 120 will be produced. If it is desirable to stop the rotor quickly, handle 108 can be moved to the opposite position quickly and this will act as a brake to stop the rotor. Such braking effect does not damage the unit. The air from the rotor passes through the opening 105e at the top of the rotor chamber out between the arms 105b, into the chamber of member 125, out through the opening in the top of housing 124 and around the bottom of the plate 113. High rotor speeds (in practice approximately 20,000 revolutions per minute) cause a high noise level which is substantially suppressed by the horsehair packing between member 125 and member 124. There are a large number of holes in members 117 and 124 so that some of the air finds an exhaust path through the said horsehair. Some of the air can exhaust from the rotor chamber downwardly through openings 104k, into the chambers of frame 100. The structure permits an extremely lightweight design of the motor which in practice has been about five pounds. The motor as constructed in practice develops approximately 5 horsepower.

*Frame and Driving Mechanism*

The air turbine is as stated secured to a frame 100 having upper and lower portions 100a and 100b. Said latter portions are connected by a rather large number of bolts and studs. There are a number of cap screws 134 having their lower ends threaded into portion 100b. There are also a number of headed and nutted bolts 135 extending through sections 100a and 100b and having nuts at their lower end. There are also several studs 136 extending through the lower section and having reduced portions threaded into the upper section. Studs 136 are threaded at their lower ends to receive nuts 137. Portions 100a and 100b are thus very firmly secured together.

The housing 104 of the turbine as stated has quite a number of apertured lugs 104n and bolts 138 extend through lugs 104n and through frame 100, the same having nuts 139 on their lower ends. The turbine is thus firmly secured to frame 100. The lower portion 104h of housing 104 of the turbine fits into a well 100d disposed centrally of frame 100 so that housing 104 is centrally located on frame 100. As above stated, the shaft 115 has a worm gear at its lower end which meshes with a pair of worm wheel gears 140 which are journaled in bearings 144, FIG. 8, carried in a split bearing casing 145. The two parts 145a and 145b of casing 145 are secured together by a plurality of circumferentially spaced headed studs 146 equipped with nuts 141a and jamb nuts 142. Casing 145 is secured to the bottom web of frame 100 by two cap screws 143, one of which is shown in plan in FIG. 6. Casing 145 is divided into said two parts 145a and 145b along the line 145c. Each worm wheel gear 140 is carried on two shafts 150 extending oppositely away from said gear and having ends in contact at the center of gear 140. Shafts 150 have slightly enlarged portions adjacent the ends of the hubs of gears 140 which are threaded to receive nuts 151 which abut the ends of said hubs. Shafts 150 are bored as shown in FIG. 8, and have threaded portions adjacent their meeting ends in said bores respectively and a member 152 exteriorly threaded at its ends engages said interiorly threaded portions of said shafts at each end thereof. The threads at the ends of member 152 are respectively right and left hand threads. Member 152 has sockets 152a hexagonal in transverse cross section in its ends respectively. The central portion of member 152 is reduced and disposed in a bushing 154 of nylon or other suitable material carried in the ends of shafts 150. A tool, such as a hexagonal wrench, can be inserted into the outer ends of shafts 150 respectively and fit in the sockets 152a so as to turn member 152 for adjusting shafts 150 so that the worm gears thereon to be later described can be properly alined with the respective worm gear meshing therewith. A removable plug 153 is threaded into the bottom of member 145a.

Shafts 150 extend into housing 158 at their outer ends, which housings are secured to the lower frame section 100b by a plurality of cap screws 159. Housing 158 has end portions in which are carried needle bearings 160 and 161 in which the outer portions of shafts 150 are journaled. Shafts 150 are formed as worm gears 150a between bearings 160 and 161 and within housings 158. The worm gears 150a on the ends of shafts 150 are respectively disposed in each of the drive mechanisms at each side of worm wheel gear 162. Each gear 162 is disposed in a housing 158 and secured to a vertical shaft 164 being formed adjacent its upper ends as a sprocket 164a. There are two shafts 164 and two housings 158, one at each end of frame 100 respectively. Shafts 164 are respectively journaled in ball bearings 165 respectively carried in housings 158. Shafts 164 are bored to make the same lighter in weight. A sleeve 166 acts as a spacer between each gear 162 and bearing 165. Each shaft 164 is journaled at its upper end in a ball bearing 167 which acts as a thrust bearing. Each shaft 164 below gear 162 is threaded to receive a nut 168. Housings 158 are open at their lower ends and closed by cover members 169 held in place by screws 170 threaded into said housings 158.

Brackets 171 are secured to the top of frame 100 at the outer ends thereof by headed screws 172. Said brackets have pivoted thereto respectively by pivots 175 the bifurcated ends of members 174. Members 174 extend outwardly and have downwardly and inwardly curved portions having at their lower ends terminal vertical surfaces 174b. Members 174 each have passages 174c therethrough and a toggle bolt 176 extends through each passage 174c. Bolts 176 each has a slot 176a therethrough in which is disposed a pivot pin 173 secured in member 174. Bolts 176 have heads at their lower ends, the lower surfaces of which are disposed closely adjacent chains 178 to be later described. Bolts 176 at their upper ends have knob handles 180 threaded thereon respectively. Handles 180 have chambers in their upper sides respectively which are closed by cover plates 185 secured to members 180 by screws 188. Said handles 180 may be rotated and moved upwardly and members 175 can then be respectively swung to the position shown in dotted lines in FIG. 8. Members 175 can be swung to the position shown at the right-hand end of FIG. 7. Handle 180 is then screwed downwardly to engage member 174. This holds member 174 in position shown in said right-hand end and in position to hold the chain 178 in engagement with sprocket 164.

Shafts 150 are enclosed in sleeve-like casings 181 adjacent housing 145 and extending a short distance into the latter. Said casings extend into the ends of hubs on member 145. Said casings 181 have O-rings 182 carried in their periphery which engage the walls of the bores in said hubs. Casings 181 have extending thereinto casings 189. Coupling caps 183 are threaded on the outer ends of casings 181 and surround casings 189. Packing 184 is disposed in the inner end of caps 183 which the ends of sleeves 181 engage. Casings 189 extend into hubs formed on members 158 and have O-rings seated in their peripheries engaging the bores of said hub. Closing caps 186 are threaded into the outer hubs of members 158 and engage annular packing material 187 engaging member 158. A fluid-tight chamber is thus formed about shafts 150 and in members 158 which can contain lubricant for the moving parts and for the worm gears and worm wheel gears in said chamber.

The frame 100 has many chambers 100g therein so its weight is kept at a comparatively low point. Chambers 100g communicate with the housing of the air turbine through openings 100e. Air is supplied to chambers 100g by an air hose 198. Said hose has a connecting fixture 190 at one end which connects with an opening 100f into chamber 100g. Air is thus supplied to the turbine by hose 198. There are openings 100e and 100f at each side of casing 145. When one of them is not in use it is closed by a cover 191 held in place by a bolt 192 which is rotated by its knurled head 192a.

In operation, the air motor is driven and shaft 115 is driven and worm gear 115a is driven. Worm gear 115a meshes with and rotates the worm wheel gears 140. Shafts 150 are secured to the gears 140 and said shafts are thus driven and will rotate the worm gears 150a thereon. Worm gears 150a are disposed at each side of the worm wheel gears 162 respectively. There are four of the shafts 150 and there is thus a worm gear at each side of each worm wheel gear 162. A balanced transmission of power from the turbine shaft 115 to the sprockets 164 is thus had. Sprockets 164a engage chains 178 and move along the same as will be later described.

*Coupling*

A coupling 298 is provided for coupling the torpedo to the drive mechanism frame. Said coupling comprises a housing 200. Housing 200 has a central bore 200a in turn having counterbores 200b and 200c. A headed screw 201 extends through bore 200a having its head disposed in counterbore 200b. Screw 201 is threaded into a member 202 held from rotation by a pin 204 secured in housing 200 and extending into member 202. An annular scroll member 205 surrounds and is rotatable on member 202. Member 205 has scroll teeth or ribs 205a on one face thereof which are arranged spirally. Member 205 has beveled teeth 205b on its inner face, thus forming a beveled gear. The beveled teeth 208a on a beveled gear 208, rotatable in a chamber in housing 200, mesh with teeth 205b.

Gear 208 is journaled in a ball bearing 209 in housing 200 and has an O-ring 210 carried therein adjacent its outer end engaging the wall of said chamber. A threaded opening 200d extends to the race 207c of ball bearing 209 and a screw 216 is threaded in said opening. Screw 216 has a slotted head disposed in a counterbore of said opening. Member 208 has a socket 208c therein of polygonal shape in cross section, adapted to receive a socket wrench 212 by which member 208 can be turned and the coupling operated. Wrench 212 is shown as having a portion 212a fitting in socket 208c. Portion 212a forms part of and is carried by part 212a1. A pin 212b connects part 212a1 to a member 212c, said latter also being connected to the bifurcated end 212f of a handle member 212d by a pin 212e extending at right angles to pin 212b. Handle member 212d is thus universally connected with member 212a1, and rotation of handle 212d will rotate member 208c.

A plurality of jaws 214, substantially cylindrical in form are slidably mounted in housing 200, the same having teeth on one side meshing with the scroll teeth on member 205. Jaws 214 are slightly beveled at 214a on their inner sides and are beveled on opposite sides 214b, as shown in FIG. 19. Housing 200 has a plurality of circumferentially spaced holes 200f passing through its flange 200g arranged to receive attaching bolts. Holes 200f are respectively axially alined with the inner ends of slots 200h in the end flange 200j of housing 200. As shown in FIG. 6, the coupling 298 is secured to link 290 by screws 292. Holes 200f are provided for the entry of a tool to turn screws 292.

In FIG. 17 the after propeller nut 218 which forms part of the torpedo is shown. By turning the wrench 212 in one direction, member 208 will be rotated which will rotate scroll 205. Scroll 205 will move jaws 214 inwardly. The coupling can now be inserted within the flange 218a of nut 218. Wrench 212 can now be turned in the opposite direction and jaws 214 will be moved outwardly. Said jaws will engage and grip flange 218a and the coupling will now be firmly secured to the torpedo.

*Chain Supports*

A pair of tripods are used to support a pair of chains along which sprockets 164a travel. A plurality of anchoring members 220, being six in number, have threaded end portions 220a which are screwed into members 223 which are in turn threaded into receptacles 222 secured in the deck. Each member 220 has a lug thereon to which is pivoted by a pivot 221 the forked end 224a of a rod 224. Rod 224 has an upper portion 224b threaded into a tubular member 225. A lock nut 226 rotatable on member 225 is threaded on portion 224b. The total length of members 224 and 225 can thus be varied. Portion 224b is flattened for some distance and provided with numbered graduations 224e. As shown in FIG. 14 there are two members 224 and two members 225. Each member 225 is bifurcated at its upper end and is pivoted to one arm 228a of an angluar member 228 by a pivot 230. Member 228 has another arm 228b extending substantially at right angles to said arms 228a, the end of which is bifurcated. The bifurcations of arm 228b have vertical alined holes therein adapted to receive a pin 231 which can pass through a link of a chain 232 so that the chain will be secured to the tripod. As shown in FIG. 37, in operation two of said tripods are used.

As shown in FIGS. 17 and 18, the other ends of chains 178 are secured respectively in a pair of bifurcated members 221 carried on the rear side of the firing ring housing forming the rear of the torpedo tube. A removable pin 227 having a knurled head passes through said members 221 and through the hinge pin opening of one of the links of chain 178.

Member 228 has a portion 228c extending downwardly at substantially 45 degrees thereto between arms 228a and 228b, which has secured thereto a tubular member 234. Member 234 has a threaded portion 234a adjacent its other end which is threaded into a tubular member 236. A lock nut 237 is threaded on portion 234a of member 234 and has an enlarged portion extending over the end of member 236. Nut 237 has an O-ring 238, FIG. 15, on said enlarged portion engaging the periphery of member 236. Member 234 has a flattened portion 234b extending along said threaded portion which is provided with numbered graduations 234c. Member 236 is bifurcated at its lower end and pivoted to one of the members 220.

It will thus be seen that the two members 224 and 225 and members 234 and 236 form a tripod. The two legs each comprising members 224 and 225 can be adjusted in length by moving member 224 farther into or out of member 225. Said parts can then be locked in position by nut 226. The position of said members can be noted by the position of nut 226 relative to graduations 224a. A record can thus be made for a future positioning of said parts. Likewise the leg comprising parts 234 and 236 can be similarly adjusted and locked in position by nut 237. The position of said parts can be noted by the position of the upper edge of nut 237 relative to graduations 234c and a record made for future positioning of said parts.

When said tripods are dismantled, the openings in members 223 are filled and closed by screws 240 with slotted heads. Each plug or member 223 has a knurled ring 223a at its top with which a loose ring 241 knurled on its inner and outer sides cooperates. The knurled teeth on ring 240b fit in the teeth on the inner side of ring 241. The teeth on the outer ring mesh with teeth knurled in the openings in receptacles 222. Members 223 are thus locked in the desired position. The top surfaces of members 223, rings 241 and screws 240 are flush with the surface of the deck.

*The Loading Tray*

The torpedo is supported upon a loading tray prior to being pushed into the torpedo tube. The loading tray 260 is formed from a metal plate. While various metals might be used, in practice the tray has been made from an aluminum plate and said plate has been substantially one-eighth of an inch in thickness. The tray is substantially U-shaped in cross section having vertical sides while its top 260a is formed with an outer concave surface. The upper corners of the tray are slightly curved and the sides are curved inwardly at their bottoms to form substantially semi-cylindrical portions 260b. The sides 260c of the tray are tapered in height from the rear to the front end. The top 260a is provided with a multiplicity of openings 260d to reduce the weight. Formed cross braces 261 are provided comprising plates having their ends bent substantially at right angles and secured to the sides by headed and nutted bolts 262. To reduce weight said plates are provided with a plurality of elongated openings 261a.

Figure 35:
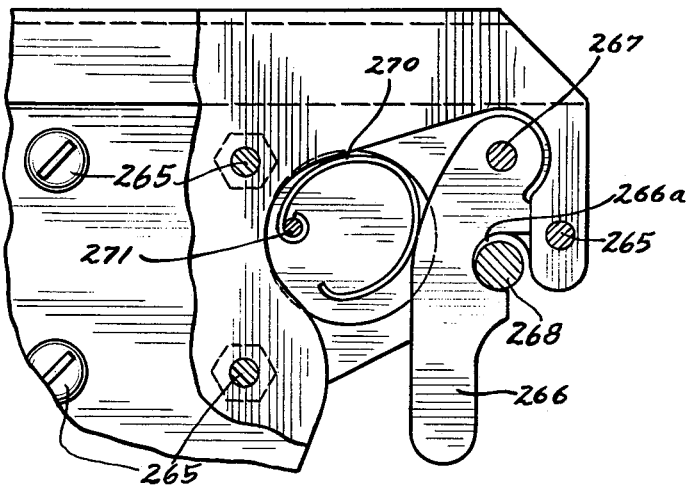
FIG. 35 is a view in side elevation of one end of the said supporting tray showing the latch therefor, some parts being shown in vertical section taken on line 35—35 of FIG. 25, as indicated by the arrows.

The top 260a is recessed at the front end in substantially semi-circular form. Plates 264 are secured to the sides of the tray at the front end thereof adjacent its top by screws 265. Plates 264 have recesses 264a formed therein at their front ends and a spring catch or latch 266 is pivoted to the tray on a pivot 267 and is provided with a recess 266a adapted to extend around the pin 268 extending between the bifurcations of brackets 263 on the rear tube support of the torpedo tube 102c. A curved plate spring 270 is secured between plates 264 by a screw 271 about which one end of the spring is bent and secured. The spring 270 engages the rear side of the latch 266 thus tending to hold said latch in latching position. It will be seen in FIG. 35 that the side of the tray is formed to extend over the pin 268.

Figure 36:
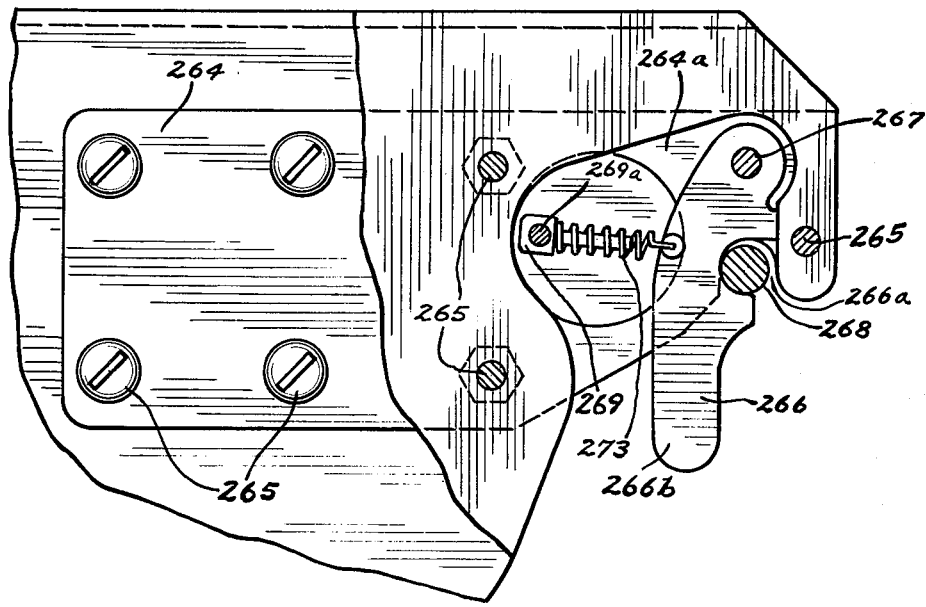
FIG. 36 is a view similar to FIG. 35 showing a modified form of structure.

In FIG. 36 a modification is shown in which a coiled compression spring 273 is connected at one end to latch 266 and at its other end engages a block 269 pivoted to plates 264, a pin 269a extending between said plates. Spring 273 acts to hold latch 266 in latching position.

From the described construction it will be seen that latch 266 can be pulled back by its handle portion 266b and the tray then dropped over the pin 268. Upon release of the latch 266 it moves under the pin 268 so that the tray cannot now be lifted or removed from pin 268 and the tube 102.

The tray has two rear legs 260g, the same being threaded at their upper ends into the hub of a bracket 272, which brackets are secured to the sides of the tray by headed and nutted bolts 274 extending through flanges on the brackets and through blocks 275 engaging cross braces 260e. The legs 260g are tapered downwardly below their threaded portions and terminate respectively in ball portions 260g1. The ball portions 260g1 are disposed in socket members 276. Nuts 278 surround legs 260g above member 276 and are threaded into receptacles 277 which will be disposed in and secured in the deck of the ship, as by welding. The legs 260g are thus held in place and they are capable of some oscillating movement. It will be noted that the diameter of member 276 is considerably less than that of the opening in receptacle 277. There is an opening 278a in the bottom of member 278 so that the leg and member 276 can be moved to different positions in receptacle 277. The hub portion of bracket 272 has an opening 272a in the outer side thereof so that graduations 260g2 placed upon the portion of leg 260g moving in said hub can be observed and a record made for future positioning.

The tray is also provided with a center leg 260h which is carried by a bracket 280 which is secured to a pair of the brace members 261 by screws 281. Leg 260h is similar to the leg 260g but the member 276 receiving the ball portion of the leg is arranged to rest upon the deck.

An opening 260i is made in the top of the tray between a pair of cross brace members 260e to accommodate the sling in which the torpedo is lowered into the tray.

Strengthening members 282 are respectively secured to the outer sides of the tray extending across the opening 260i. The sides 260c of the tray extend respectively into recesses 282a formed in member 282 and a screw 284 extends through a block 279, the end of the cross brace 261, side of tray 260c, into brace member 282 securing said parts together, as shown in FIG. 30. The inner portion 282b of member 282 extends into the opening 260i and extends across the same. Members 282 are cylindrical and screws 285 extend through the central portions of members 282 and through the side 260c of the tray, which side extends upwardly into a recess 282c in member 282, as shown in FIG. 34.

*Safety Link*

A safety link 290 is used between the frame 100 and the coupling 298. Said link comprises a pair of flat flanges 290a and 290b disposed in parallel relation and connected by a portion 290c of comparatively small cross section. Flanges 290a and 290b have curved ends concentric to the center point of said flanges. Flange 290a is provided with four tapped holes 290d. Flange 290b is provided with four slots 290e having semi-circular inner ends which are concentric with the center lines of the tapped holes 290d, as shown in FIGS. 22–24. Link 290 is secured to frame 100 by bolts 291 which extend through the slots 290e into the side of frame 100. Link 290 is secured to coupling 298 by bolts 292 which extend through the slots 290h of the coupling 298 into the tapped holes 290d. The link 290 is thus securely fastened to said members. In the case of unusual strain in pushing the torpedo into the tube the link would fracture at part 290c and prevent injury to a coupling or other parts.

In FIGS. 17 and 18, frame 100 is shown, as are also the chains 178. Knobs 180 and brackets 174 are shown. The coupling member 198 is shown which supplies air to the motor. Brackets 110a are shown and an operator's hand holding handle 108 in connection with one bracket 110a giving forward propulsion to the frame 100 is shown. The frame 100 is connected by the connecting safety link 290 to the coupling 298. The jaws of coupling 298 engage in the terminal nut or propeller nut 218 of the torpedo T.

*General Layout*

In FIG. 37 the general layout of the torpedo tube and loading device is shown. The loading tray 260 is shown in place on the deck and a torpedo T is shown being lowered onto the loading tray by a derrick 300 comprising a boom 300a pivotally connected about a horizontal axis to a base member 300c of a vertical member 300b which is in turn pivoted at its bottom about a horizontal axis to said base member 300c which is secured to the main deck 301 of a ship. Member 300b is braced by a rodlike member 300d pivoted at its lower end about a horizontal axis to a member 300f secured to deck 301. Member 300b is also braced by another member 300g also pivoted about a horizontal axis at its lower end to a member 300h also secured to the deck of a ship. A drum or reel 300i is carried on members 300b and 300g to which is secured a cable 300j which is wound on reel 300i. Members 300d and 300g are pivoted to member 300b at their upper ends and about horizontal axes. Reel 300i will be rotated to wind up cable 300j to manipulate sling 300k which is engaged by a hook 300m attached to cable 300j. As stated, the opening 260i in the loading tray accommodates the sling 300k when the torpedo is lowered onto the tray. A pair of the torpedo tubes 102 are shown. Chains 178 are shown at each side of the torpedo tube T, said chains being secured at one end to the end portion of the torpedo tube 102, as shown in FIGS. 17 and 18, and secured at their rear ends to tripod structures including members 220, as already described. Frame 100 is shown, as is also the air motor 103. The railings 302 at each side of the main deck are shown, as is also the ladder 303. The railing 304 of the lower deck is also shown, as is the main mast 305 of the ship and a portion of the smoke-stack 306. Some of the super structure on the main deck is shown as 308. The hose 198 for supplying air to the air motor is also shown.

*Loading Operation*

The loading of a torpedo into tube 102 proceeds as follows.

The plugs 240 are first removed from the receptacles so that the bottoms of the tripod legs may be secured therein. (FIGS. 9–13.) The loading tray 260 is first connected to the lugs 263 on the front support 102c of the torpedo tube by engaging latches 266 over pins 268 respectively. By pulling back the two spring loaded catches 266 at the front of the tray, the slots 266a may be lowered over the pins 268 in the tube supporting brackets 263. Release of said latches allows them to move forward so that the tray cannot be separated from the tube. The tray is then lowered so that the two legs at the rear thereof drop into the deck sockets 276. The adjustable legs 260g may be set to the settings found stamped on the instruction plate on the control panel and the tray will then be properly positioned. If it should be the first positioning of the tray, it can be positioned as follows. Place a straight edge in the torpedo tube and let it project over the tray. The rear legs 260g can then be adjusted until they reach the proper height. After establishing longitudinal parallelism between the tray and the tube bore, the center leg 260h may be moved downwardly until it rests on the deck, at which time it will act to support the load of the torpedo. The holes in the deck receptacles 277 receiving the rear legs 260g are one-half inch larger in diameter than the member 276 at the lower ends of said legs. The rear end of the tray may be swung through a small arc in said socket members 276 due to the small extent of play in the connection of the tray to the tube. The rear tray legs 260g should be moved from side to side in receptacles 277 and then positioned in the center of the holes 278a as a temporary measure of establishing correct alinement laterally. Final alinement will be later described.

The two roller chains 178 of equal length will be fastened to the tube 102. These chains are secured by pins 227 on the sides of the firing ring housing which is on the rear end of the torpedo tube. (FIGS. 17–18.) The same number of links on each chain starting from the tripods should be painted yellow or some other bright color. Said painted links should be on top of the chains to assure observation by the operating personnel. The chains are then stretched along the deck. The tripods are fastened to the deck sockets as described. The middle legs 234 and 236 are shortened causing the other legs to swing forwardly. The rear ends of the chains are then secured to the tripods as described. The tripods are then adjusted as indicated by the recorded position of the graduations. In the absence of records as in initial location the tripods will be adjusted to tighten the chains until they have approximately ½ to ¾ of an inch sag at their midportions.

The loader drive mechanism including the air turbine motor is now connected to the chains. The knobs 180 and bolts 176 are loosened until members 175 can be swung about pivot 174 so that members 175 can be used as handles to carry the mechanism to chains 178. The sprockets 164a are then engaged with chains 178, extreme care being taken to have the same number of links between each sprocket and the tripod to which its chain is connected. The painted links should be on top of the chain so as to be easily observed. The members 174 are then swung down against the chains, as shown in FIG. 7, and the chains are held in proper relation to sprockets 164a.

The drive unit including frame 100 should be moved back to the last yellow painted links nearest to the tripods and a torpedo should then be lowered into tray 260 (FIG. 37) so that the sling 300k used to carry the torpedo fits into the opening 260i in the tray. Said sling may then be removed and the drive unit moved up to the tail end of the torpedo. Although the alinement of the chains 178 and tray 260 have been by eyesight, the universal coupling 198 can be moved into the tail nut 218 at least within one-half inch. The position of the coupling may be manipulated by pushing the drive unit until the coupling can be moved all the way into the tail nut and tightened with a socket wrench as above described. The air motor can now be operated and a torpedo moved slowly into the torpedo tube. Sprockets 164a as stated, walk or move along chains 178. When the diameter body of the torpedo enters the tube, the loading tray 260 which has not been locked in position will quickly slide sideways to establish the correct alinement with the torpedo tube bore. The torpedo should then be drawn back partway out of the tube so that the body thereof is half in the tray and half in the tube. The torpedo should then be pulled completely out of the tube and the coupling unit 198 disconnected. With the coupling completely withdrawn from the torpedo tail nut so that the drive unit is free, any misalinement which might exist should be observed and corrected by adjusting the tripod legs. When the coupling is then properly alined with the torpedo tail nut 218, the indicated readings on the legs of the tripod and tray should be stamped on the plate provided on the control panel cover on the torpedo tube. These readings may then be used to quickly accomplish reinstallation of the loading equipment. The coupling is now again connected to the tail nut, the air motor put in forward position, and the torpedo is moved into the torpedo tube.

After the torpedo has been moved into the torpedo tube 102, the coupling is disconnected from the tail nut of the torpedo. Movement of the handle 108 to the reverse position will initiate drive of the air motor to retract the frame 100 along the chains to an initial load receiving position as shown in FIG. 37. The handle 108 is then moved to the neutral position. The torpedo tube may then be fired and a subsequent torpedo lowered into the tray 260.

From the above description it will be seen that I have provided a very novel structure for moving a torpedo into a torpedo tube as well as a novel method for doing the same. The structure also comprises novel means including stationary members spaced respectively at the sides of the torpedo, together with rotatable propulsion members engaging said member and movable therealong by their rotation to move the torpedo into the tube, together with means for rotating said propulsion members. More specifically the novel structure includes stationary chains spaced at the side of the torpedo respectively and rotatable sprockets engaging in the links of said chains and movable along said chains by their rotation to move the torpedo into the tube, together with means for rotating said sprockets. The novel structure also includes an air motor for rotating the above mentioned sprockets and a driving mechanism for said sprockets driven by said motor and carried on a frame together with said motor, which frame and motor move along said chains with said sprockets. The structure also includes novel means for supporting said chains. Said supporting means for one end of the chains is supported on the deck or other support and can be quickly and easily removed and stored in a comparatively small space. The structure includes the above mentioned novel features as well as quite a few others.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claims.

What is claimed is:

1. A device for moving a torpedo into a tube having in combination, a member having means for mateably engaging said torpedo and having rotatable members at each side thereof, means carried by said first-mentioned member for rotating said rotatable members, stationary members at each side of said tube respectively and extending longitudinally therefrom in a manner to be engaged by said rotatable members for moving said member and torpedo to move the latter into said tube.

2. The structure set forth in claim 1, wherein said second mentioned means comprises an air motor carried between said rotatable members, means for rotating said rotatable members from said motor, and means for supplying air to said motor.

3. A device for moving a torpedo into a tube having in combination, means including a pair of spaced rotatable members and a releasable chuck adapted to engage and be carried by said torpedo, and stationary means at each side of the axis of said torpedo and extending substantially parallel to said axis engaged by said rotatable members, and means for rotating said rotatable members relative to said stationary means so that said rotatable members rotate and advance along said stationary means and move said torpedo into said tube.

4. A device for moving a torpedo into a torpedo tube having in combination, a pair of stationary members disposed to extend longitudinally along the path of travel of said torpedo and respectively in parallel with the sides thereof, rotary propulsion members arranged to engage said members and be moved along the same by their rotational engagement therewith, a frame carrying said propulsion members and adapted to move said torpedo, guide means for said torpedo, a motor carried by said frame and comprising a drive shaft, and means for rotating said propulsion members by said drive shaft.

5. The structure of claim 4, wherein said last-named means comprises a worm gear on said shaft, a pair of worm wheel gears meshing with said worm gear at opposite sides thereof, and means for rotating said propulsion members from said worm wheel gears.

6. The structure set forth in claim 5, further comprising a casing enclosing said worm wheel gears, and means securing said casing to said frame.

7. A device for moving a torpedo into a torpedo tube having in combination, means for providing a mating engagement of said device with a rearwardly disposed portion of a torpedo, a motor, a frame to which said motor is secured, a shaft driven by said motor, a pair of spaced horizontally alined sprockets carried by said frame, driving means for rotating said sprockets from said shaft and carried by said frame, and a pair of stationary chains disposed to be engaged by said sprockets respectively, said sprockets respectively moving along said chains to move said frame for moving said torpedo into said tube.

8. The structure set forth in claim 7, and means carried by said frame for holding said chains in mesh with said sprockets.

9. A device for moving a torpedo into a torpedo tube having in combination, a frame having releasable means for matingly engaging a rearward portion of a torpedo whereby it is adapted to move said torpedo, a motor, a pair of sprockets adjacent the ends of said frame, shafts to which said sprockets are respectively secured, a worm wheel gear secured to each of said shafts, a pair of worm gears meshing with each of said worm wheel gears respectively at opposite sides thereof, two pairs of shafts to the ends of which said worm gears are respectively secured, a pair of spaced second worm wheel gears, two shafts of each of said pairs of shafts secured respectively to each of said second worm wheel gears at opposite sides thereof respectively, a worm gear between and meshing with each of said second worm wheel gears, and a shaft driven by said motor on which said last mentioned worm gear is carried.

10. A device for moving a torpedo into a tube having in combination, a pair of stationary link chains disposed respectively at each side of said torpedo and substantially parallel to the axis thereof, supporting means for said chains at the respective ends thereof, a carriage having a portion configured to mate and engage a rear portion of said torpedo whereby it is adapted to move said torpedo, sprockets adjacent opposite sides of said carriage, a motor, means for rotating said sprockets from said motor, said sprockets respectively engaging said chains and being moved therealong by their rotation to move said carriage and thus move said torpedo into said tube.

11. A device for moving a torpedo into a torpedo tube having in combination, a motor, a shaft rotated by said motor, a worm gear on said shaft, a worm wheel gear meshing with said worm gear and having a hub, a pair of elongated shafts secured in said hub and extending in opposite directions therefrom, each of said pair of shafts having a longitudinal bore extending therethrough, a member disposed in said bores having portions at each end threaded into said shafts, said member having a coupling means in an end thereof for rotating said member to move said shafts longitudinally.

12. The structure set forth in claim 11, said threaded portions of said member being on one end a right-hand thread and on the other end a left-hand thread.

13. A device for moving a torpedo into a torpedo tube having in combination, a motor, a shaft rotated by said motor, a worm gear on said shaft, a worm wheel gear meshing with said worm gear and having a hub, a pair of shafts respectively secured at one of their ends in said hub and extending in opposite directions therefrom, said shafts having bores extending therethrough, a member disposed in said bores having portions at each end threaded into said shafts, means for holding said member from longitudinal movement, said member being constructed to be rotated to move said shafts longitudinally.

14. The structure set forth in claim 13, worm gears on the other ends of said shafts and worm wheel gears meshing with said last mentioned worm gears respectively.

15. A device for moving a torpedo into a torpedo tube having in combination, a casing, a sprocket journaled in said casing, a chain at one side of said sprocket, a bracket secured to said casing, a second bracket pivoted to said bracket, said second bracket having a surface adjacent said sprocket and disposable in a position to hold said chain in mesh with said sprocket.

16. The structure set forth in claim 15, and means for holding said second bracket in said position.

17. The structure set forth in claim 15, a member having a head at one end and a threaded shank at its other end, a pivot connecting said member to said second bracket, means on said casing beneath which said head can be swung and a member threaded on said shank and engaging said second bracket for holding it in said position.

18. A device for moving a torpedo into a torpedo tube having in combination, a motor, a shaft driven by said motor, a gear secured to said shaft, second gears at each side of said gear respectively, a pair of shafts having ends secured to said second gears respectively and extending from opposite sides thereof respectively, a second pair of shafts having ends respectively secured to the other second gear and extending from opposite sides thereof and parallel to said first mentioned pair of shafts respectively, third gears secured to the ends of said first mentioned pair of shafts respectively, fourth gears secured to the ends of said second pair of shafts respectively, a fifth gear disposed between and meshing with said third gears, a sixth gear disposed between and meshing with said fourth gears, a third shaft secured to said fifth gear, a sprocket secured to said third shaft, a fourth shaft secured to said sixth gear and a sprocket secured to said fourth shaft, said sprockets being in horizontal alinement, and a frame carrying said motor, shafts and gears.

19. A device for moving a torpedo into a torpedo tube having in combination, a pair of flexible members extending from each side of said tube longitudinally thereof and substantially parallel to the axis of said tube, a tripod at one end of each of said flexible members for supporting the same, and means holding the legs of said tripods in stationary positions.

20. The structure set forth in claim 19, certain of said legs being longitudinally extensible and contractible.

21. The structure set forth in claim 19, a bracket secured to the upper end of one of the legs of one of said tripods, means for holding said bracket in different angular positions about a substantially horizontal axis, and means connecting the end of one of said chains to said bracket.

22. The structure set forth in claim 21, another leg of said tripod being pivotally connected at its other end to said bracket.

23. The structure set forth in claim 19, a bracket secured to the upper end of one of the legs of one of said tripods, means for holding said bracket in different angular positions about a substantially horizontal axis, and means connecting the upper end of the other legs of said tripod to said bracket.

References Cited by the Examiner
UNITED STATES PATENTS

| | | | |
|---|---|---|---|
| 697,126 | 4/02 | Becker | 89—45 |
| 786,252 | 3/05 | Emery | 89—45 |
| 1,525,359 | 2/25 | Bjorklund | 114—238 |
| 1,658,004 | 1/28 | Methlin | 114—238 |
| 2,003,327 | 6/35 | Woodberry | 89—40.16 |
| 2,425,425 | 8/47 | Jorgensen | 89—45 |
| 2,625,899 | 1/53 | Miller | 114—238 |
| 2,745,317 | 5/56 | Stanton et al. | 89—46 |
| 2,770,169 | 11/56 | Gerdin | 89—45 X |
| 2,785,607 | 3/57 | Henstrom et al. | 89—45 |

FERGUS S. MIDDLETON, *Primary Examiner.*

SAMUEL BOYD, BENJAMIN A. BORCHLET,
*Examiners.*